(12) United States Patent
Christ, Jr. et al.

(10) Patent No.: US 7,813,962 B2
(45) Date of Patent: Oct. 12, 2010

(54) SYSTEM AND METHOD FOR GENERATING AN IMAGE FULFILLMENT ORDER

(75) Inventors: Charles S. Christ, Jr., Rochester, NY (US); James S. Honan, Spencerport, NY (US); Ronald M. Wexler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1252 days.

(21) Appl. No.: 11/156,321

(22) Filed: Jun. 17, 2005

(65) Prior Publication Data
US 2007/0005447 A1  Jan. 4, 2007

(51) Int. Cl.
*G06Q 30/00* (2006.01)
(52) U.S. Cl. .......................... 705/26; 705/37
(58) Field of Classification Search .............. 705/26, 705/37
See application file for complete search history.

(56) References Cited

U.S. PATENT DOCUMENTS

| 5,164,831 | A | 11/1992 | Kuchta et al. |
| 5,991,748 | A * | 11/1999 | Taskett ........................ 705/41 |
| 6,554,504 | B2 * | 4/2003 | Cook et al. ................. 396/567 |
| RE38,447 | E | 3/2004 | Meyers |
| 2003/0038835 | A1 | 2/2003 | DeFelice |
| 2004/0041819 | A1 | 3/2004 | Barry et al. |
| 2004/0204985 | A1 * | 10/2004 | Gibson et al. ................. 705/14 |
| 2005/0005061 | A1 | 1/2005 | Robins |

FOREIGN PATENT DOCUMENTS

EP    0 860 980 B1    8/2003

OTHER PUBLICATIONS

Digital Cameras Change Consumer Picture; H-P, Retailers and Online Outfits Scramble for Upper Hand in Lucrative Print Business, Pui-Wing Tam. Asian Wall Street Journal. New York, N.Y.: Nov. 23, 2004. p. A.12, downloaded from ProQuestDirect on the Internet on Jun. 16, 2010, 6 pages.*

* cited by examiner

*Primary Examiner*—James Zurita
(74) *Attorney, Agent, or Firm*—David A. Novais; Eugene I. Shkurko

(57) ABSTRACT

The present invention relates to a method of ordering images at an imaging device which permits a user to print images immediately, and simultaneously with the printing of the images, access further images for editing. The method of the present invention also provides a running account to the user as the user decides to print an image that details the cost of the jobs as they are being performed. Further, the system provides an ability to check the transaction cost versus the deposit for a fulfillment session and update the cost as the jobs are fulfilled.

18 Claims, 10 Drawing Sheets

SYSTEM AND METHOD FOR GENERATING AN IMAGE FULFILLMENT ORDER

CROSS REFERENCE TO RELATED APPLICATIONS

Reference is made to commonly-assigned U.S. patent application Ser. No. 10/230,917 filed Aug. 29, 2002, entitled SYSTEM AND METHOD FOR GENERATING AN IMAGE FULFILLMENT ORDER to Michael J. Barry et al.

FIELD OF THE INVENTION

The invention relates generally to the field of imaging, and in particular to generating an image fulfillment order.

BACKGROUND OF THE INVENTION

A common method of placing a photofinishing order is for a consumer to place their exposed film in an envelope and mark the appropriate boxes on the envelope to indicate the goods and/or services that they desire. The completed envelope is then dropped at a retail location. The envelopes are picked up from the retail location and taken to a wholesale or other photofinishing laboratory where the order is processed. The processed order is returned to the retail location for pick-up by the consumer.

With the introduction of digital imaging, a consumer can place an order using a digital image, hereinafter referred to as an image fulfillment order. Such an image fulfillment order can include, but is not limited to prints, photo CDs, picture disks, T-shirts with images, mugs with images, puzzles, and posters. In addition, the fulfillment order can include a request for the digital image to be stored on a medium such as a CD, floppy, or other digital media. Accordingly, an image fulfillment order can include an order for any good and/or service that relates to imaging.

As is well known, a digital image can be provided on a variety of media, such as on a computer disk, floppy disk, memory card, memory stick, or the like. For example, if the consumer uses a digital camera to capture an image, the consumer's image is in a digital format on a memory card. Alternatively, as well known to those skilled in the art, a hardcopy output print can be converted to digital form using a scanner.

Some digital cameras allow a user to use the digital camera's display to select which images to print and designate the number of copies to make. This information is then stored on the digital camera's memory card. One standard directed to this feature is known as DPOF (digital print order format). This feature is disclosed in EP 0860 980 A2 (Parulski et al) which is commonly assigned.

When placing an image order, the consumer may have images from a variety of sources, from hardcopy prints to digital images on memory cards or on CDs. In addition, the consumer may need to consider what order to place for each image, which may result in a large fulfillment order. Still further, the consumer may desire to edit/modify a particular image prior to placing an order for that image.

Disclosed in US2004/0041819 is a system and method for building an image fulfillment order which permits the consumer to edit an image prior to placing the order, shows the order as the order is built, and allows a non-serial workflow (i.e., any image can be selected at any time while placing the order). This system and method is suitable for batch-processing, that is, processing after a complete order has been determined. Within the contexts of the present invention, processing relates to actions that occur after an image is submitted to, for example, a photo kiosk. Processing can include at least one of printing, storing, transmitting, image editing, and any other order fulfillment manipulations. However, when a number of images are manipulated or modified before processing, the order fulfillment time (OFT) can be large, OFT is the total amount of time for the order to be fulfilled, beginning from when the images are first provided to the order fulfillment system to the time fulfillment of the order is complete. OFT is largest in a batch mode where all decisions related to the order are completed before processing begins. For an order comprising only images to be processed "as is", the majority of the OFT is determined by the rates of processing, storing, and/or printing the images in the order. For an order comprising only images to be processed after modification of the digital images, the OFT is largely determined by the rate at which the user can complete editing in addition to the rate at which the processing occurs, such as the time necessary for a printer to print the images. Large OFT can result in reduced customer satisfaction since the amount of time to wait for an order to be fulfilled can be long depending upon the number of images and the specific fulfillment selections. Reduced throughput in the printers can also result since a certain amount of printer idle time may exist between orders, resulting in reduced profit for the print service provider.

US RE38,447 describes a stand alone customer operated photofinishing apparatus. Included in the device is a payment mechanism for accepting payment from a customer, which can be a credit card reader.

US 2003/0038835 describes a digital photo kiosk for viewing and e-mailing electronic photos. The kiosk comprises a credit card reader. A method of payment is described in which the customer swipes a credit card for authorization and payment after an order has been completed.

US 2005/0005061 describes a high speed system that seeks to reduce OFT by reducing the amount of time for computer systems to do image processing but does not account for the time lost waiting for a multi-part order to be created.

Known image fulfillment arrangements do not provide the user with an option to access or edit a second image of an image order while the first image of the order is being printed, and create a running account or "tab" which is being monitored and updated as needed. More specifically, there is a need for an order fulfillment method that permits fulfillment of a portion of an order as soon as a decision pertaining to that portion is made. There is also a need to enable a user to begin printing an image as soon as the decision to print the image is complete. There is also a need to enable a user to begin printing images while modifying other images, without requiring a separate order or a separate step to access the other images. There is further a need for the retailer to secure payment before partial fulfillment of an order has commenced, and for a retailer to secure additional payment when the cost of the transaction exceeds the original amount secured. Fulfilling these needs will provide the shortest OFT and greatly improve order fulfillment efficiency. Further, the method should be user friendly and suitable for use by a novice user.

SUMMARY OF THE INVENTION

An object of the invention is to simplify an image ordering method when the order comprises a mix of images to be processed without modification of the digital images (i.e. process "as is"), and images to be processed after some modification. The invention enables editing of the latter images while the former are printing. Further, when more than one image is edited, printing of the first edited image can begin while the subsequent images are edited.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

Accordingly, the present invention relates to a method of generating an image order using an imaging device having a display. The method comprises accessing a plurality of digital images; displaying at least one of the plurality of images on a display of an imaging device; initiating an image fulfillment session by selecting at least one image of the plurality of images to be processed; selecting a first image fulfillment process for the at least one image; securing a transaction deposit for payment for the first image fulfillment process for the at least one image; creating a transaction session account for at least the first image fulfillment process; confirming that a transaction charge in accordance with at least the first image fulfillment process is to be applied to said transaction session account; initiating said first image fulfillment process for said at least one image; applying the transaction charge for completion of the first image fulfillment process to the transaction session account; and selecting a second image fulfillment process for at least a second one of the plurality of images.

The present invention further relates to a method of generating an image order using an imaging device having a display which comprises creating a transaction session account for an image fulfillment session that comprises at least a first image fulfillment process, wherein the first image fulfillment process comprises performing an imaging service on at least one first image of a plurality of images; securing a deposit for payment for the first image fulfillment process for the at least one first image; accessing the plurality of digital images; displaying at least one of the plurality of images on a display of an imaging device; selecting at least one image of the plurality of images for the first image fulfillment process; confirming that a transaction charge in accordance with at least the first image fulfillment process is to be applied to said transaction session account; initiating said first image fulfillment process for said at least one first image; applying the transaction charge for completion of the first image fulfillment process to the transaction session account; and selecting a second image fulfillment process for at least a second one of the plurality of images.

The present invention further relates to a method of generating an image order using an imaging device having a display that comprises creating a transaction session account for an image fulfillment session that comprises at least a first image fulfillment process, wherein the first image fulfillment process comprises performing an imaging service on at least one first image of a plurality of images; securing a transaction deposit for payment for the first image fulfillment process for the at least one first image; accessing the plurality of digital images; displaying at least one of the plurality of images on a display of an imaging device; selecting at least one first image of the plurality of images for the first image fulfillment process; confirming that a transaction charge in accordance with at least the first image fulfillment process is to be applied to the transaction session account; applying the transaction charge for completion of the first image fulfillment process to the transaction session account; initiating the first image fulfillment process for the at least one first image; and selecting a second image fulfillment process for at least a second one of the plurality of images.

The present invention further relates to a method of generating an image order using an imaging device having a display that comprises accessing a plurality of digital images; displaying the plurality of images on a display of an imaging device; selecting at least one first image of said plurality of images for performing an imaging service without image editing; generating a transaction cost for the imaging service without image editing of the at least one first image; securing a transaction deposit for payment for the imaging service without image editing of the at least one first image; confirming that a charge in accordance with the imaging service without image editing of the at least one first image is to be applied to the transaction cost; and performing the imaging service without image editing on the at least one first image; wherein at least during a start of the imaging service without image editing of the at least one first image, the method further comprises selecting at least one second image of the plurality of images for an imaging service that includes editing; confirming that the secured deposit is sufficient to cover the imaging service with editing of the at least one second image; adding costs for the imaging service with editing for the at least one second image to the transaction cost; and performing the imaging service with editing to the at least one second image.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
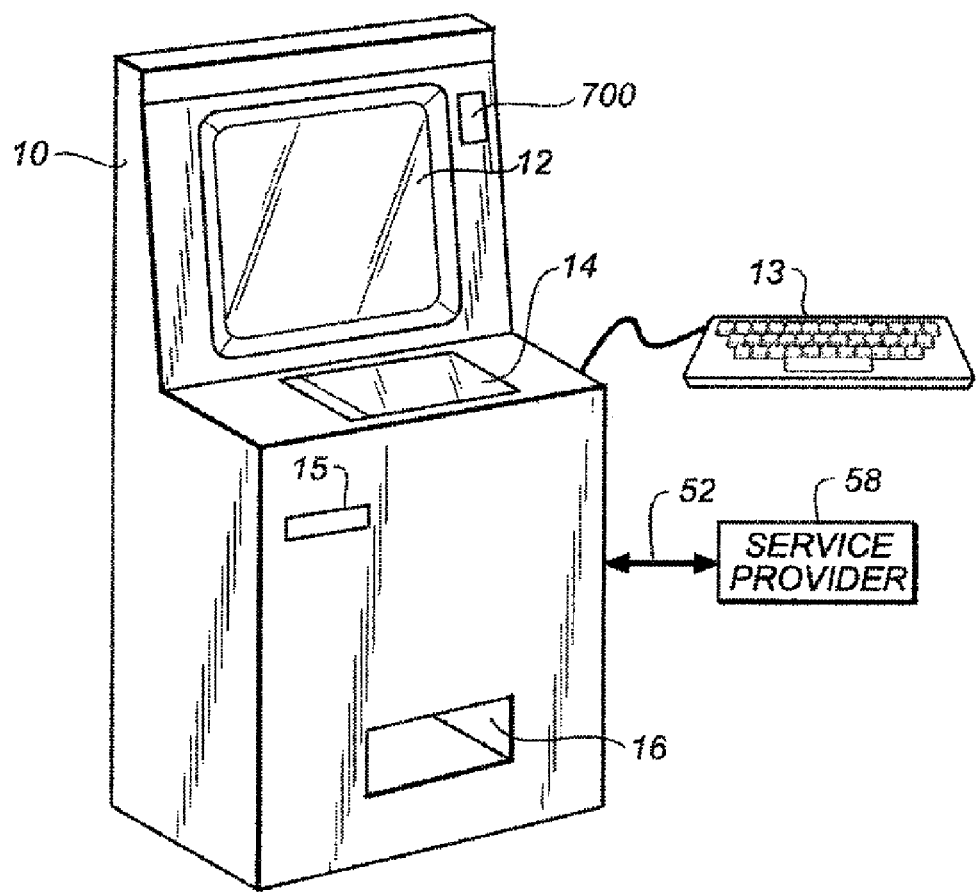
FIG. 1 shows an imaging device in accordance with a feature of the present invention.

The following is a detailed description of the preferred embodiments of the invention, reference being made to the drawings in which the same reference numerals identify the same elements of structure in each of the several figures.

The present invention employs an imaging device having a display for displaying at least a digital image or images. For ease of convenience in describing the invention, the imaging device of the present invention will be disclosed as being a kiosk, such as a Picture Maker™ kiosk produced by Eastman Kodak Company. However, those skilled in the art will recognize that the system and method of the present invention can be employed with other imaging devices having a display for displaying a digital image, for example, including but not limited to, a digital camera, a film/digital hybrid camera, PDAs, mobile phones having image displays, minilabs, and a computer running imaging software.

Figure 2:
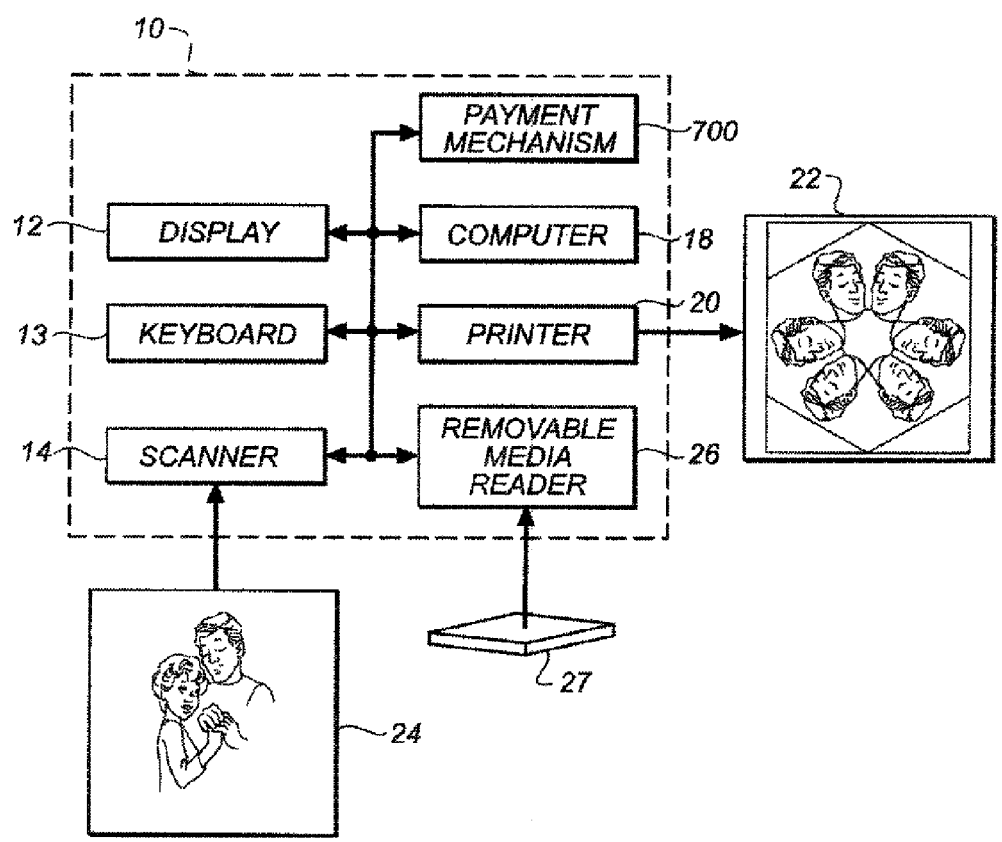
FIG. 2 generally shows a diagram of included functions of the imaging device of FIG. 1.

Referring now to FIGS. 1 and 2, an imaging device 10, configured as a kiosk, is generally illustrated in FIG. 1. Imaging device 10 includes a color display 12 for presenting information to a user. Color display 12 can be a touchscreen display, whereby a user can provide information and data to imaging device 10, or a keyboard 13 may be employed to provide information and data. A scanner 14 can be provided for receiving a user-supplied visual image and converting the visual image into digital form. Alternatively, an input port 15 can be provided for receiving a user-supplied visual image in digital form, such as from a memory card, floppy disk, compact disc, PictureCD, or the like. Imaging device 10 can optionally include a delivery section 16 for controlling the delivery of a medium, for example, a hardcopy print. Delivery section 16 is illustrated in FIG. 1 as an opening in imaging device 10. A payment mechanism 700 such as a credit or debit card reader, or a cash payment acceptor 700 can be implemented in the device 10 to provide a user with several payment options.

FIG. 2 generally shows a diagram of included functions of imaging device 10. As illustrated, imaging device 10 includes keyboard 13 for entering information/data into a computer 18. Computer 18 typically manages the flow of information and functionality of the components of imaging device 10. Imaging device 10 can optionally include a printer 20. Printer 20 responds to commands of computer 18 for forming an image on a medium such as thermal or ink-jet paper. Dye diffusion transfer printers, sometimes known as dye sublimation printers, using a dye donor ribbon heated by a thermal printhead to transfer dye to a receiver are preferably employed. Printer 20 can be part of device 10 as illustrated or can be a remote printer. A remote printer can be a silver halide minilab processor. An example of an output image is illustrated in FIG. 2 at 22 which was formed from a user-supplied visual image 24. As described above, another method of receiving user-supplied visual image 24 is illustrated by a removable media reader/writer 26 for receiving removable media 27, for example, a memory card, floppy disk, compact disc, PictureCD, or other form of removable media used in transferring digital files, or for transferring (i.e., writing) a fulfillment order (alone or in combination with the corresponding digital image) to removable media 27, whereby the removable media 27 is delivered/transferred to the photofinishing laboratory for processing of the fulfillment order.

Figure 3:
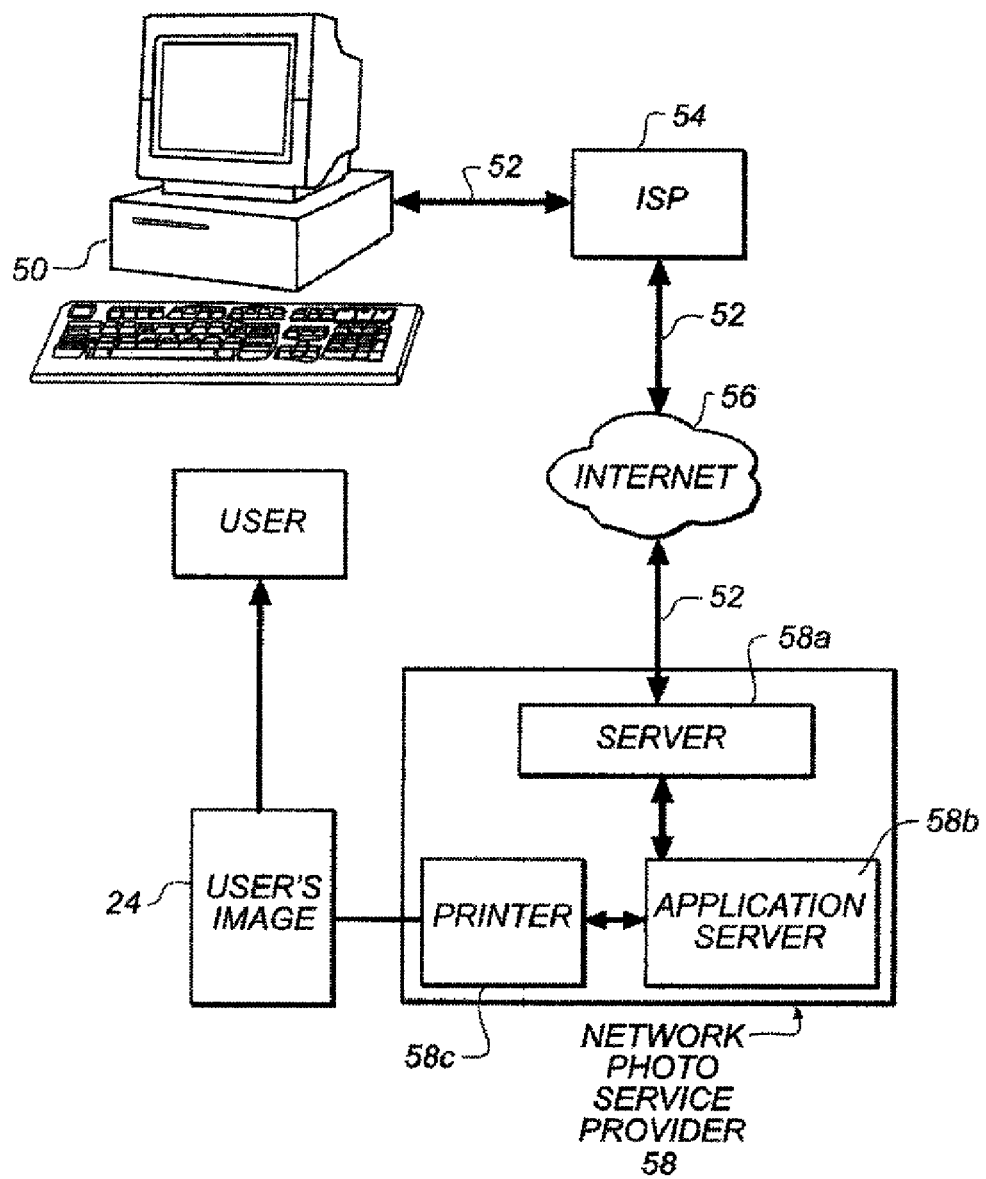
FIG. 3 shows a communication network suitable for use with the present invention.

It may be desired to transmit a fulfillment order from imaging device 10 to a service provider from which the service provider can store, print, or send the digital image. For example, if a consumer's fulfillment order includes a request for prints and imaging device 10 does not include a printer, the digital image can be transmitted to a service provider for fulfilling the fulfillment order. Accordingly, a communications network, generally shown in FIG. 1 at 52, provides a communication network for transmitting an image to a service provider 58. If imaging device 10 is a computer, such as a home or personal computer, a service provider can also be employed. For example, referring to FIG. 3, when employing a service provider, a computer 50, can be used as imaging device 10 for viewing the user's image 24. Communication network 52 for transmitting image 24 can be by means of an internet service provider (ISP) 54 and the internet 56 to a service provider 58 having a server 58a, an application server 58b and a printer 58c.

Figure 4:
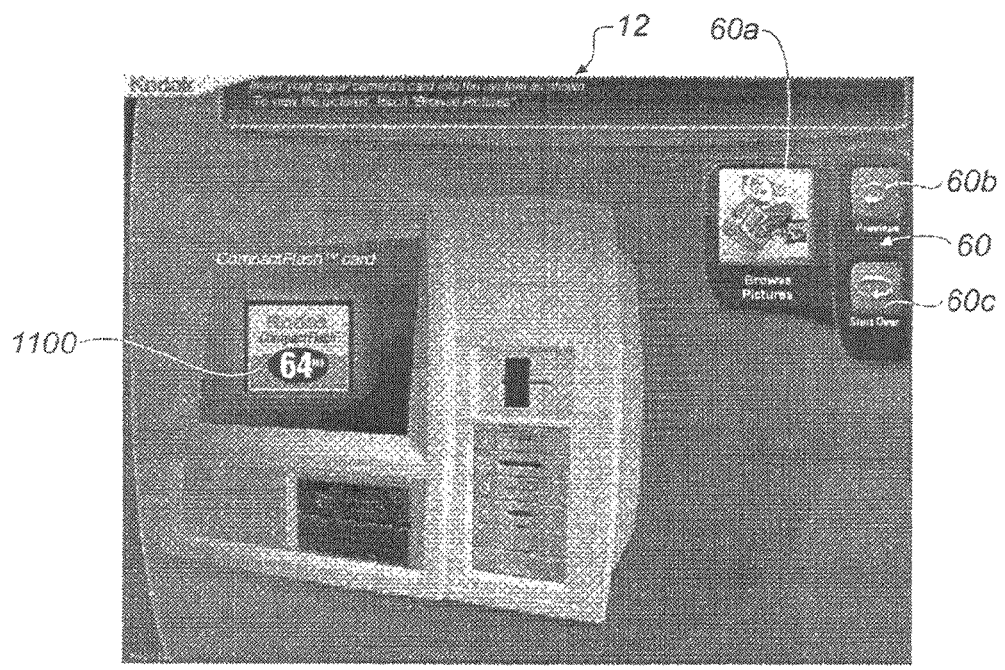
FIG. 4 shows a display of the imaging device showing instructions for accessing an image using the imaging device.

Using imaging device 10, at least one digital image is accessed and displayed on display 12. Access and display of the images is accomplished using methods known to those skilled in the art. For example, as discussed above, means for accessing the images can be accomplished by scanning a hardcopy print or employing input port 15 to receive removable media 27. If imaging device 10 is a digital camera, the captured image can be displayed upon capture. Display 12 can provide instructions to the user for accessing the digital image. For example, as shown in FIG. 4, a picture of a memory card 1100 can be shown on the display 12 along with instructions to "Insert your digital camera card into the system as shown". To view the pictures, a user can touch a browse picture button 60a in a selection area 60. Selection area 60 can include further buttons for accessing the images, with the buttons at least including "previous" and "start over", buttons 60b, 60c.

Figure 5:
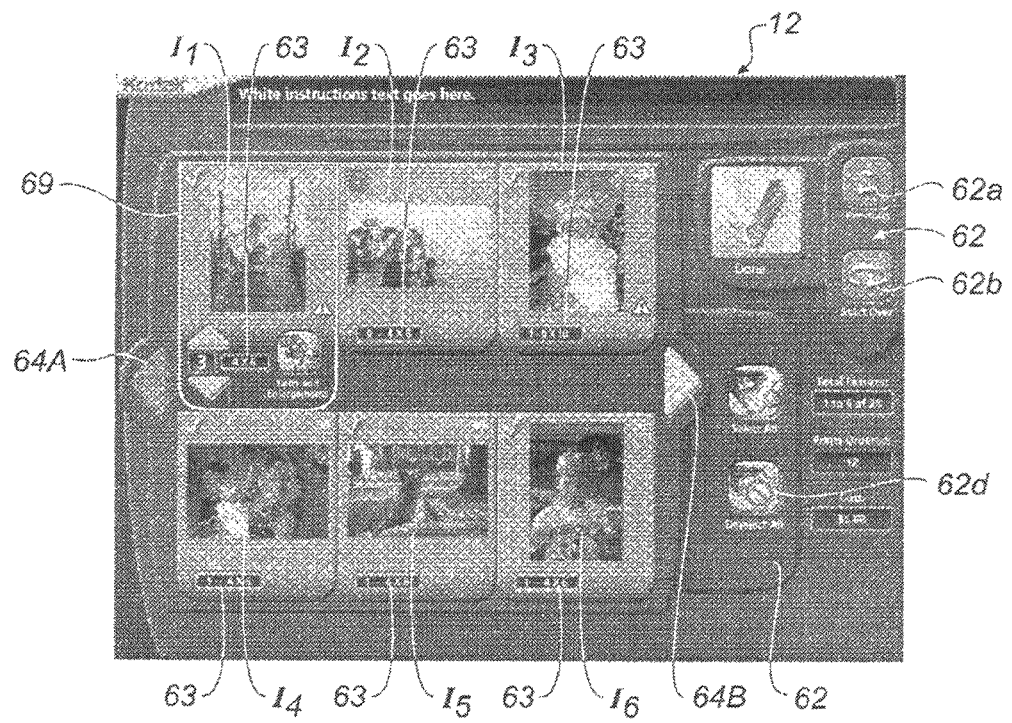
FIG. 5 shows a display of the imaging device of the present invention displaying a plurality of images.

When the desired images have been accessed, a predetermined number of the images $I_1$, $I_2$, $I_3$, $I_4$, $I_5$, and $I_6$ can be displayed on display 12 as shown in FIG. 5. In one embodiment, the number of the displayed image can be optionally noted proximate each image. It is understood that the number of images to be displayed can be dependent on the user's choices or the capability of the display device, and that the displayed images do not overlap. It is further understood that more images can be accessed than can be displayed on display 12.

Preferably, the images displayed on display 12 are a thumbnail size image so that the images are quickly accessed for viewing. Low-resolution "thumbnail" size images can be created as described in commonly-assigned U.S. Pat. No. 5,164,831.

In FIG. 5, a selection member 64A can be used to display a predetermined number of previous thumbnail images while a selection member 64B can be used to display a predetermined number of next thumbnail images.

A selection member 62 can be employed for selecting at least one of the displayed images. Selection member 62 can include icons, buttons, a touchscreen, a wand, a keypad, a keyboard, a voice recognition arrangement, and the like well known to those skilled in the art. In FIG. 5, selection member 62 can be a touchscreen wherein the image is touched, or icon buttons 62a, 62b as shown that can be touched to permit a user to navigate among the displayed images to select the desired image. For example, a highlighted box or color indicator can be used to navigate among the displayed images so as to indicate which image is the desired image for selection.

Examples of selection member 62 shown in FIG. 5 also include a "select all" icon 62c for selecting all the displayed images and a "deselect all" icon 62d for deselecting all the displayed images. In a preferred embodiment, all images are defaulted to a "not selected" mode upon display on display 12.

If the "select all" icon is selected, a default fulfillment order can be associated with all the images. For example, upon selection of "select all", the fulfillment order will include one 4×6 format print of each accessed image. Similarly, if the "deselect all" icon is selected, the fulfillment order for each image will be configured to "zero" (i.e., no order).

The fulfillment order or an image fulfillment session is defined here as the total of all processing that is desired by the user and requires payment. A portion, such as an image fulfillment process of the image fulfillment session is associated with each processing step for a displayed image that requires payment. Preferably, the portion or fulfillment process of the fulfillment order or session associated with each displayed image is displayed proximate the image. In one embodiment, each image includes a fulfillment display 63 which displays the fulfillment order for the particular image and the running total payment associated with fulfilling any portion of the order. In FIG. 5, each fulfillment display 63 is shown as having a rectangular shape. It is understood that fulfillment display 63 may comprise other shapes/sizes.

A default fulfillment order can be associated with each displayed image, such as, no order (i.e., there is no order for any of the displayed images until the user acts, similar to "deselect all") or one 4×6 print (similar to "select all"). For example, referring to FIG. 5, image $I_2$ has no order associated with the image (i.e., 0-4×6), while image $I_4$ has an order of one 4×6 print associated with the image (i.e., 1-4×6), and image $I_3$ has an order of one 8×10 associated with the image (i.e., 1-8×10).

Figure 6:
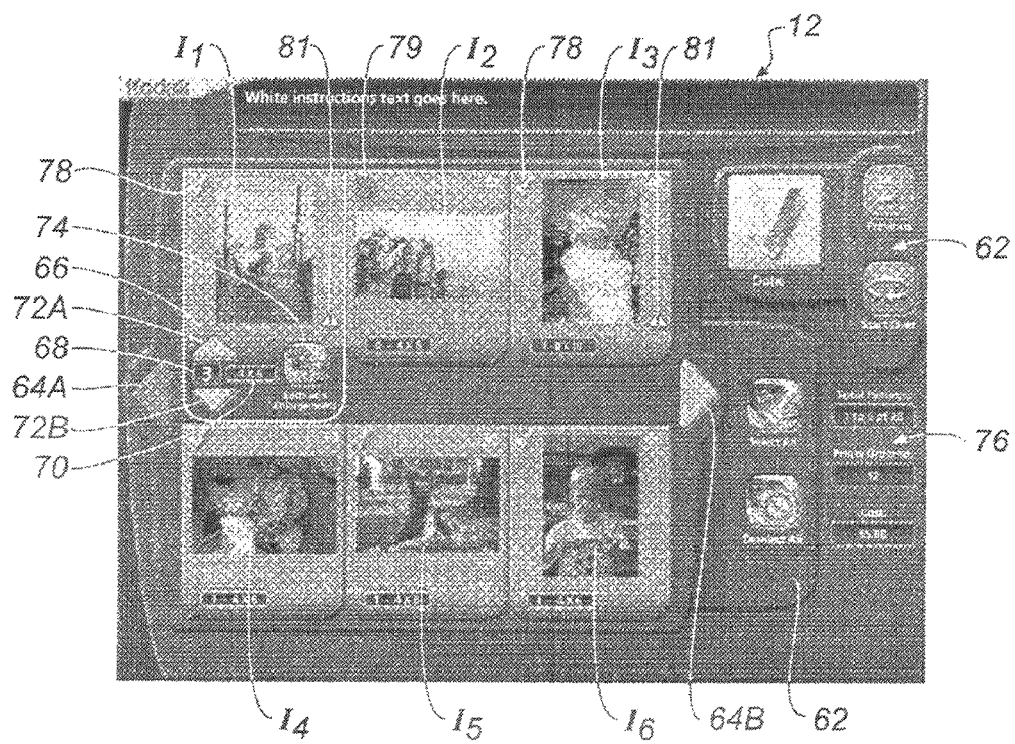
FIG. 6 shows the display of FIG. 5 showing a fulfillment order menu associated with one of the images.

To modify the fulfillment order associated with a displayed image (i.e., change 0-4×6 to 3-8×10 or change 1-4×6 to 0-4×6) the desired image is selected. For example, referring again to FIG. 5, image $I_1$ has been selected as indicated by a highlighted box 69 that outlines image $I_1$. In response to the selection of the displayed image $I_1$, a fulfillment order menu is displayed, as shown in FIG. 6. The fulfillment order menu can be completed to generate a fulfillment order associated with the selected image. For example, referring still to FIG. 6 and image $I_1$, a fulfillment order menu 66 is displayed proximate image $I_1$. Accordingly, with one selection (i.e., the selection of an image), an order menu is directly displayed. That is, with just one "button press", an order menu is generated.

When fulfillment order menu 66 is displayed, the image associated with the displayed fulfillment order menu does not substantially change or alter its position/location on display 12. That is, the selected image is located at a predetermined location on display 12. When menu 66 appears on display 12, the remainder of the display is not changed. That is, the selected image remains located and displayed at the predetermined location on display 12. For example, referring to FIGS. 5 and 6, image $I_1$ did not change size, position, or location when menu 66 was displayed. Menu 66 is displayed so as to not obscure or overlap its associated image. Stated alternatively, menu 66 associated with the selected image "pops up" in response to the selection of the image; the selected image remains at the predetermined location and menu 66 does not cover the selected image.

Preferably, the entire selected image is displayed when menu 66 "pops up". However, it is understood that only a portion of the selected image (e.g., a top portion or a bottom portion) could be displayed. For example, if menu 66 overlaps/obscures a portion of the selected image, then only a portion of the selected image will be displayed.

In a preferred embodiment, menu 66 also does not cover, obscure, or overlap any other image displayed on display 12. In FIG. 6, images $I_1$-$I_6$ are arranged such that menu 66 is displayed so as to be spaced from each other. Accordingly, when menu 66 is displayed, menu 66 is displayed within the spaces disposed between the displayed images. As such, none of the displayed images are covered when menu 66 is displayed on display 12 for any of the displayed images.

Selecting another image will close menu 66 for the previously selected image. For example, to hide menu 66 for image $I_1$, the user can select image $I_2$. When image $I_2$ is selected, menu 66 associated with image $I_2$ is displayed and menu 66 associated with image $I_1$ closes.

In a preferred embodiment, when display 12 displays the predetermined number of images, menu 66 is displayed for one of the images, such as image $I_1$ to assist the novice or first time user in understanding how to place a fulfillment order.

Input means known to those skilled in the art are used to modify the fulfillment order menu. Referring still to FIG. 6, menu 66 includes input means for modifying/placing a fulfillment order, including a number box 68, a format box 70, arrows 72A, 72B, and an editing member 74. Number box 68 displays a number associated with how many prints of the image are desired. Format box 70 disposed proximate number box 68 displays the format/size associated with the print. For image $I_1$ of FIG. 6, number box 68 shows a "3" while format box 70 shows a "4×6" indicating that the user is placing an order for three 4×6 hardcopy prints. Format box 70 can be modified to reference another format size, such as "3×5" or "5×7". Two arrows 72A, 72B are disposed proximate number box 68, and can be used to modify the number of hardcopy output prints of the fulfillment order.

Editing member 74, which will be discussed in further detail below, provides a customization menu to further fulfillment order options. According to one embodiment of the invention, a message to enable the user to defer editing until fulfilling of other portions of fulfillment orders are underway can be displayed. An example for such a message is as follows: "To expedite order fulfillment, place in Edit Queue?". According to another embodiment of the invention, while accessing an image, the user can be instructed to place images to edit into an edit queue so that portions of fulfillment orders for images that do not require editing can be processed as soon as possible.

As a further option, a processing member or Process or Print Now button/member 100 (FIG. 8) can be provided any where on the display or in the vicinity of an image, such as image $I_1$, and can be adapted to provide the user the option to begin fulfilling a portion of the fulfillment order for the image displayed according to the method of the invention. The Process or Print Now member 100 provides a "pop-up" menu to enable the user to confirm that fulfillment of a portion of the fulfillment order for the image displayed can begin and that authorization to debit against a secured payment means is granted. The Process or Print Now member can have any number of textual or iconic indicators to enable the user to proceed to processing an image as soon as they are ready to do so. Examples of textual references include "Print Now", "Process Now", "Print As Is", and the like.

When a fulfillment order has been associated with an image, a mark or other indicator can optionally be shown to provide a notice to the user. In FIG. 6, a mark 78 is shown on images $I_1$, $I_3$-$I_6$ as a check mark.

If no fulfillment order has been associated with an image, another mark or indicator can optionally be shown to provide such a notice. In FIG. 6, a mark 79 is shown on image $I_2$ as a zero with a slash through it.

If the image quality of a requested print order is believed to be of a low quality resolution, a mark or other indicator can optionally be shown to provide a notice to the user. In FIG. 6, a mark 81 is shown proximate images $I_1$ and $I_3$ as an exclamation point, warning the user of potential unacceptable image quality of the print. For example, an unacceptable image quality output could result from an enlargement of a low-resolution image.

Display 12 includes a total order area 76 wherein information relating to the total fulfillment order is provided to the user. For the fulfillment order shown in FIG. 6, 28 images have been accessed, of which six images are displayed in display 12, and the fulfillment order comprises 12 prints for a total dollar amount of $5.88. Total order area 76 is preferably updated with the modification of each menu 66. According to one embodiment of the invention, the amount displayed can correspond to the amount "spent" or charged against deposit because processing has been initiated through use of the Print Now option.

When the fulfillment order is complete, the user can indicate the completion of the order by means known to those skilled in the art. For FIG. 6, the "done" icon of selection member 62 can be selected.

An example of an order flow in accordance with an embodiment of a method of the present invention is as follows. First, a plurality of digital images are accessed and displayed. Then, selection members such as buttons or touchscreen are used to select at least one digital image from the plurality of digital images. A fulfillment order menu is displayed responsive to the selection of the at least one digital image while displaying the selected at least one digital image. The fulfillment order menu is associated with the selected at least one digital image. Input means are then provided for modifying the fulfillment order menu to generate the fulfillment order for the selected at least one digital image.

Figure 7:
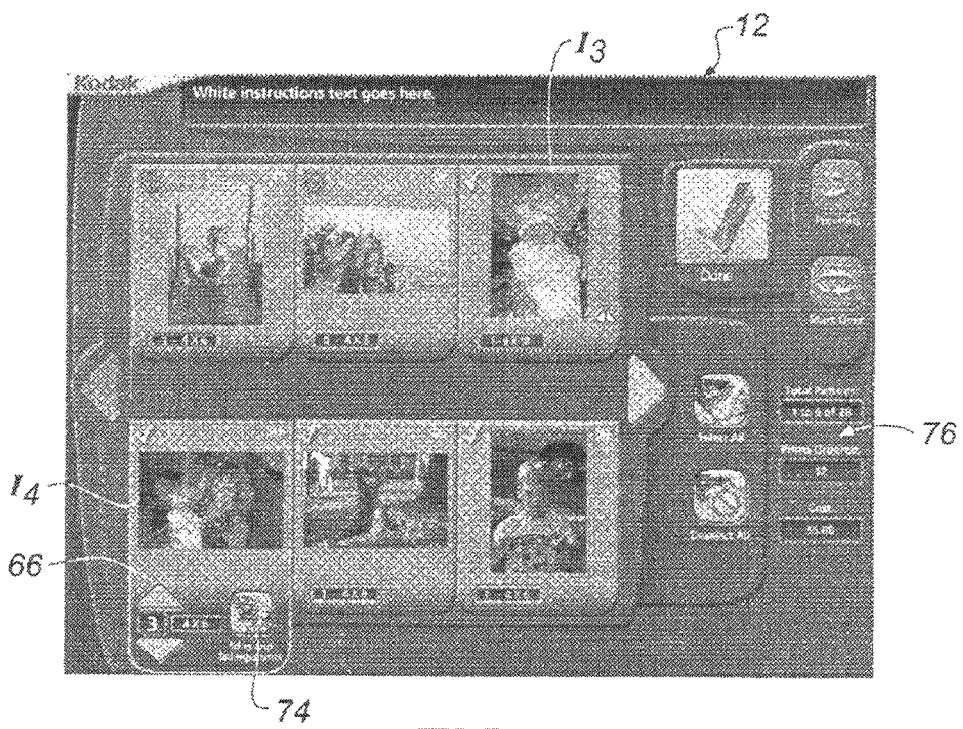
FIG. 7 shows the display of FIG. 5 showing a fulfillment order menu associated with another one of the images.

FIG. 7 shows another example of the present invention wherein image $I_4$ shown on display 12 has been selected to generate a fulfillment order. As shown in FIG. 7, when image $I_4$ is selected, menu 66 associated with image $I_4$ "pops up" for display on display 12 simultaneous with the display of selected image $I_4$. The location of image $I_4$ does not alter when menu 66 is displayed nor is image $I_4$ covered or obscured by menu 66.

Figure 8:
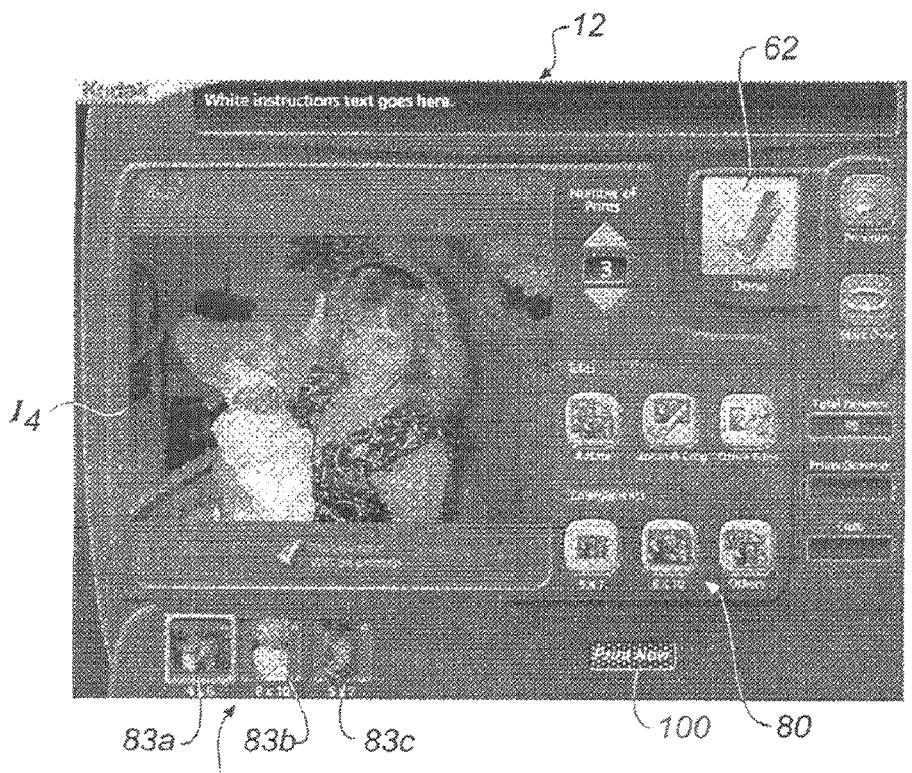
FIG. 8 shows the display of the imaging device of the present invention displaying a customization menu associated with the selected image of FIG. 7.

If a fulfillment order other than a 4×6 print (unedited default order) is desired, the user can select editing member 74 for additional edits and enlargements. When editing member 74 is selected, display 12 displays a customization menu 80, as shown in FIG. 8. That is, when editing member 74 is selected, customization menu 80 is displayed wherein the selected image is presented for customization of the fulfillment order.

Referring still to FIG. 8, customization menu 80 allows an image to be customized to generate an edited or modified image. For example, at an editing section 800, the image can be rotated, zoomed, and cropped by means known to those skilled in the art to generate a modified or edited image. More edits can be applied to customize the selected image, such as color balance, color brightness, and black and white. Input means are provided to accomplish customization of the selected image.

Once a modified image has been generated, a fulfillment order, a partial fulfillment order, or a portion of the fulfillment order can be associated with that modified image. For example, for image $I_4$ shown in FIG. 8, three modified images 83a, 83b, 83c have been generated as shown by the three images located in modified image area 82. A Print Now member 100 can be used to expedite printing after each image editing is completed.

For each edited image, a fulfillment order, a partial fulfillment order, or a portion of the fulfillment order can be placed. The fulfillment order can include enlargements, for example, format sizes 5×7, 8×10 and the like or include other photo-finishing goods or services, including a poster, mug, tee-shirt, and CD. For FIG. 8, the fulfillment order being built includes a 4×6 of first modified image 83a, an 8×10 of second modified image 83b, and a 5×7 of third modified image 83c. Print Now member 100 can be used to expedite printing after all three images are created.

When the fulfillment order is complete, selection member 62 is selected to indicate completion. For FIG. 8, selection member can 62 include a save button to indicate completion or other buttons such as "previous" or "start over". Upon selecting selection member 62, the user is returned to the screen of display 12 shown in FIG. 7 (i.e., the previously viewed screen). Preferably, total order area 76 shown in FIG. 7 is updated accordingly. It is noted that this update feature may not be necessary if the Print Now 100 is used and when printing/e-mailing are the modes of processing; Storage to CD may be accomplished after all images to store are completed. Storage of edited images may employ a pop-up window to ask user to decide.

Referring back to FIG. 8, the modified images 83a, 83b, 83c generated using customization screen 80 (i.e., the images displayed in modified image area 82) can also be displayed in display 12 alongside the accessed images to fully illustrate to the user the fulfillment order which is being generated. For example, second modified image 83b (shown in FIG. 8 in modified image area 82) which was generated using customization menu 80 can be shown as image $I_3$ in FIG. 7.

Figure 9:
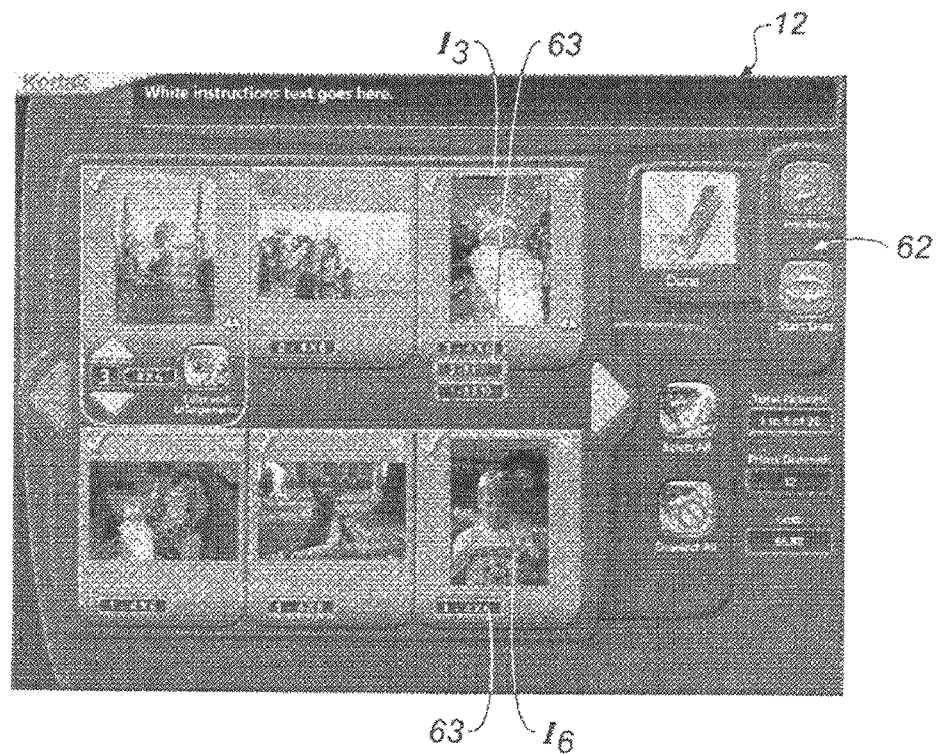
FIG. 9 shows the display of the imaging device illustrating fulfillment orders associated with the displayed images.

If the fulfillment order comprises prints of more than one format size, this can be reflected accordingly in display 12. For example, for illustrative purposes, display 63 of FIG. 9 illustrates that the fulfillment order of image $I_3$ comprises three formats—1-4×6, 1-5×7, and 1-8×10. Alternatively, only a portion of the total fulfillment order for a particular image can be displayed in display 63. This might be preferred if viewing space on the display is limited. For example, for illustrative purposes, referring to FIG. 9, the fulfillment order associated with image $I_6$ may include one 4×6 print and one 8×10 print, yet fulfillment display 63 of image $I_6$ shown in FIG. 9 (as illustrated) may only show the number of 4×6 prints being ordered. Accordingly, the entire fulfillment order for the particular image would be obtained by selecting the image and viewing the associate fulfillment order menu 66.

Instructional text or audio information can also be used to assist the user in generating a fulfillment order.

Further, the fulfillment order can be viewed at any time. The user navigates to view the order menu by selecting selection member 62, shown in FIG. 9 as the "done" button. This enables the user to review what portions of their order have been fulfilled or are in queue for fulfillment.

Figure 10:
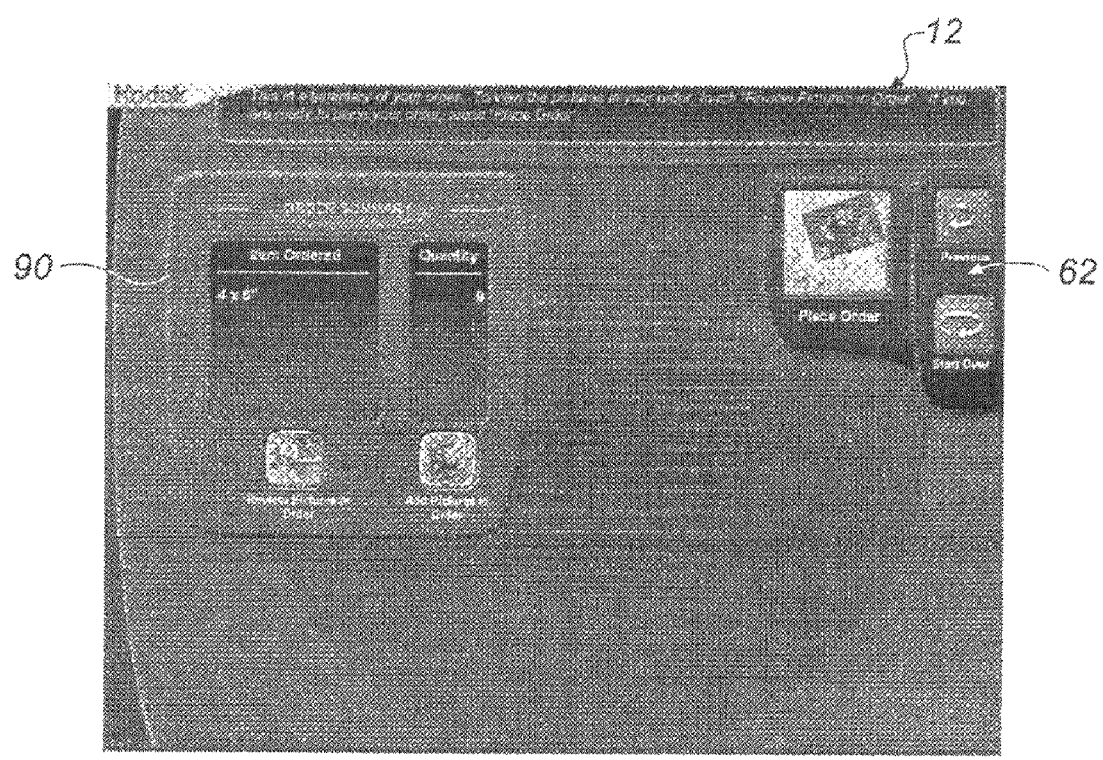
FIG. 10 shows the display of the imaging device illustrating a first embodiment of an order summary of the fulfillment order.

In a feature of the invention, a preview order menu can provide an order summary. FIG. 10 shows display 12 illustrating one embodiment of a preview order menu 90 wherein the order summary is arranged by format size. (It is understood that preview order menu 90 shown in FIG. 10 does not accurately reflect the fulfillment order generated in FIGS. 5-6, and 8-10.) As a further option (not shown), display 12 can illustrate the preview order menu wherein the order summary is arranged for each image. Those skilled in the art will recognize that other arrangements for an order summary are known. As a further option, menu 90 can provide you with the status or summary of your order that can separately indicate those images that have been fulfilled and the cost incurred to that point, and those images that have not yet been acted on by the user.

To place the order, selection member 62 is selected. In FIG. 10, selection member 62 can includes a "place order" button which indicates acceptance of the order.

The fulfillment order (the order information alone, the images alone, or the combination of the order information and the associated image(s)) can be transmitted over the communication network to a service provider for processing, or alternatively, written to a CD or other removable media for physical transport to a service provider. Still further, if imaging device 10 includes a printer, the order can be fulfilled by imaging device 10.

In a feature of the present invention a fulfillment order can be built in a non-serial workflow. That is, any image can be accessed at any time during the generation of the fulfillment order. For example, images can be skipped, and images can be cropped, zoomed, color balanced. The system and method of the present invention allows the user to change the order at any time until the final "order complete" acceptance is selected except when "Print Now" button 100 has been selected.

The fulfillment order is accomplished with a minimal number of button presses, thereby allowing the user to quickly build the fulfillment order.

The present invention preferably supports DPOF. That is, if a DPOF fulfillment order was associated with a particular image prior to the image being accessed/displayed by imaging device 10, it is preferred that imaging device 10 retains the DPOF fulfillment order and queries the user as to how to proceed with the DPOF fulfillment order. For example, imaging device 10 can display the DPOF fulfillment order proximate the image. Alternatively, imaging device 10 can query the user to determine if the user wants to by-pass or re-set the DPOF fulfillment order. Still further, the imaging device 10 can automatically incorporate the DPOF fulfillment order with the user's fulfillment order being generated using imaging device 10 such that the DPOF fulfillment order is displayed to the user (i.e., the DPOF fulfillment order is the default). Those skilled in the art will recognize other methods of addressing the support of DPOF.

Figure 11:
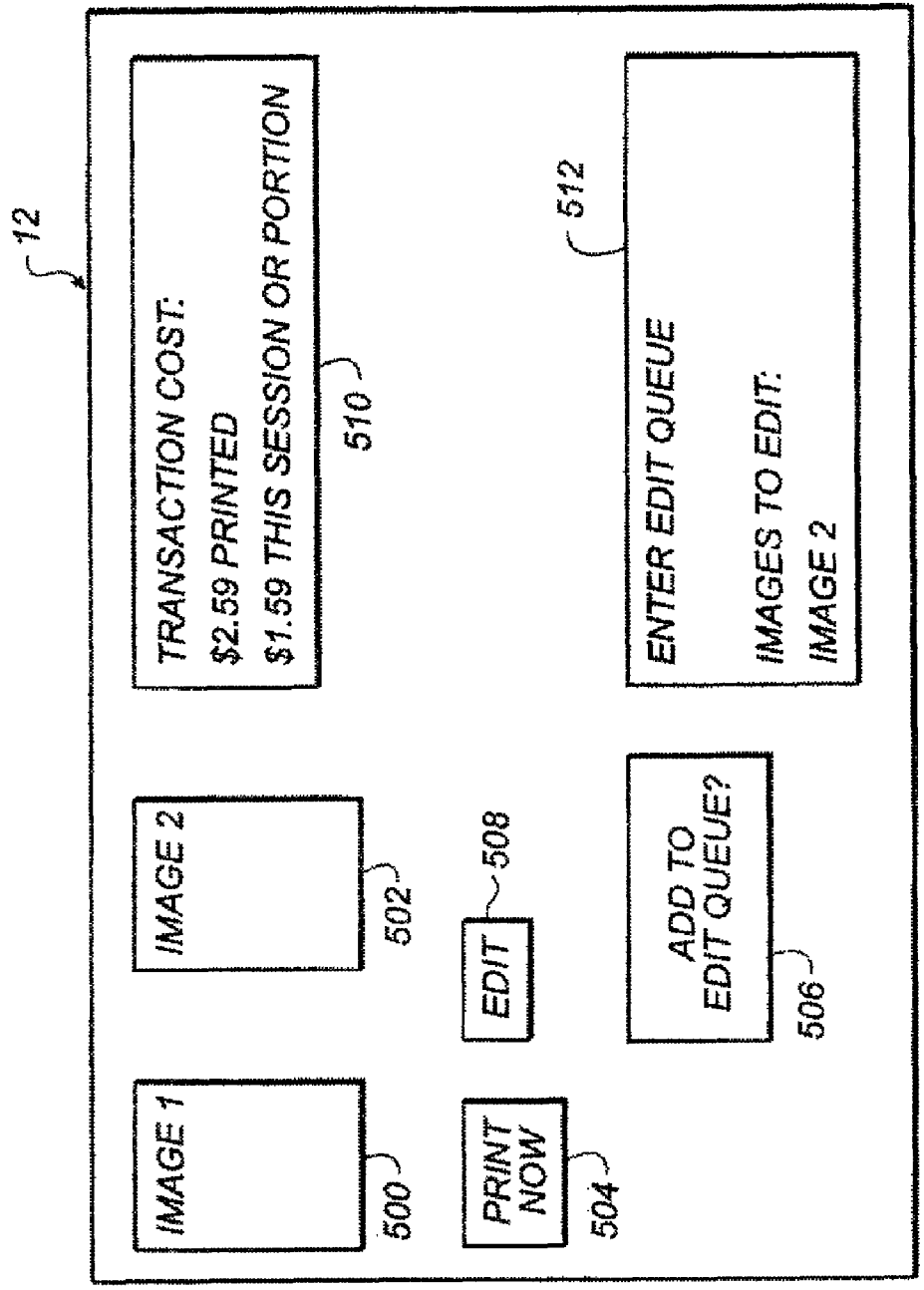
FIG. 11 shows the display of the imaging device illustrating a further embodiment of the present invention.

FIG. 11 illustrates a further embodiment of a method and system in accordance with the present invention. As shown in FIG. 11, display device 12 which is a schematic representation of the display of the imaging device can be adapted to display several images. In the example of FIG. 11, Image 1 (500) and Image 2 (502) are previewed as thumbnails. As described above, in one feature of the present invention, parallel processing can be utilized to make the session at the kiosk efficient and rapid. More specifically, if at the display device, the user previews Image 1 (500) and Image 2 (502), the user can immediately decide to print Image 1 as is without edits. In this situation, the user can touch the PRINT AS IS button 504 which will immediately begin printing Image 1. At this point, the user has initiated an image fulfillment session and is performing a first image fulfillment process for Image 1. In response thereto, the kiosk as illustrated in FIG. 1 which includes a payment mechanism 700 can be adapted to request that the user provide a means for securing a payment for the first image fulfillment process, i.e., the printing of Image 1.

Parallel to this or after the payment means are secured, a transaction cost window 510 could be presented to the user which will provide the user with the cost for the printing of Image 1. As Image 1 is being printed, the user can then decide to edit Image 2. Accordingly, parallel with the printing of Image 1, the user can press edit button 508 and will then be prompted by a window, for example, window 506 which asks the user if they would like to add Image 2 to an edit queue 512. Once Image 2 is added to the edit queue 512, the queue 512 can be adapted to list the images that are to be edited. At that point, the user can choose to edit Image 2 or add more images to the edit queue. In the process of the present invention, after Image 2 is edited and the user decides to print the image in a manner as previously described, the transaction cost can be updated to add the printing of the second image. Therefore, with the system of the present invention, the user will have a running total or tab of his/her transactions. Further, if desired, at each point that the user decides to print an image, the system checks to make sure that the deposit is sufficient to cover the cost of the prints.

With the system as illustrated in FIG. 11, a user can, for example, choose to print the first five images of his/her order immediately as is, and in parallel with the printing of the first five images, the user can edit the sixth and seventh images of the order by entering an edit mode as described above while the first five images are being printed. As the user continues to add image fulfillment processes to the fulfillment session, the transaction cost window 510 will be updated to reflect the additional fulfillment processes.

Figure 12A:
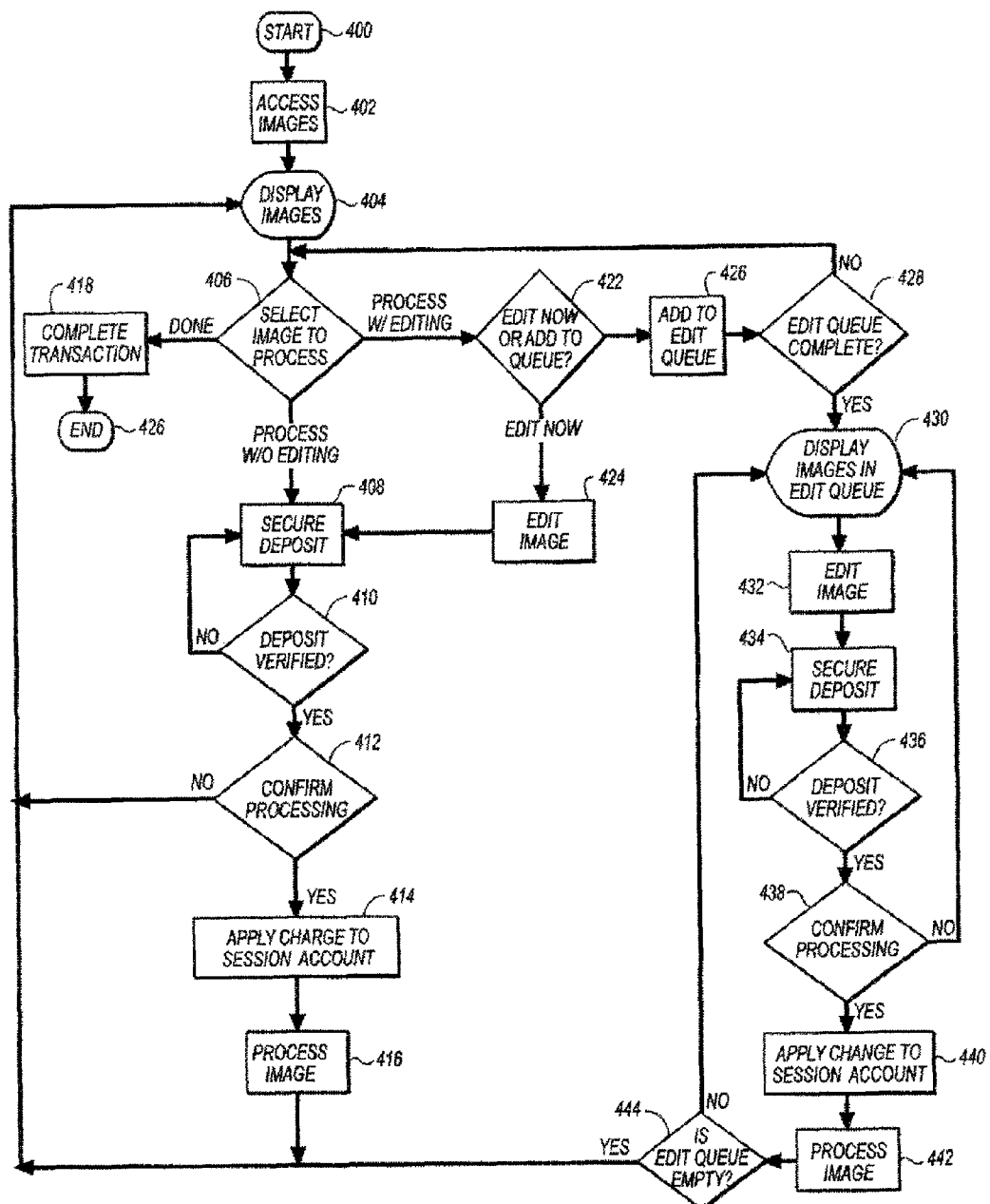
FIGS. 12A and 12B show flow charts illustrating workflows with regard to present invention.

FIG. 12A is a flow chart of a representative embodiment of a process in accordance with the present invention as described above. More specifically, as shown in FIG. 12A, at a start step 400, a user would appear at a display of an imaging device such as a kiosk. In step 402, the user accesses his/her images which can be images presented by the user on an electronic medium that is submitted to the imaging device, can be prestored images that the user has downloaded from the internet, can be images that are wirelessly submitted to the imaging device or can be images that are scanned in. In step 404, the images are displayed on display 12. Step 406 requires the user to select images to be processed, for example, printed, transmitted or stored. For the processing of the images, the user can select to process the images with editing or process without editing. It is noted that editing refers at least to such features as color correction, red-eye reduction, zooming, cropping, bordering, etc. If the user desires to process the images without editing, the process proceeds to step 408 where the user is required to secure a transaction deposit. With respect to securing a transaction deposit, the user would be required to either present their credit card or debit card to the imaging device or provide a dollar amount to the imaging device. At step 410, it is verified whether the deposit has been secured. If the answer is no, the process would loop back to the secured deposit step 408 to determine if a deposit will be secured. Once the deposit is verified, the system proceeds to step 412 to confirm that the processing without editing will be performed on the image (for example, printing a 4×6 image resulting from selection of the "Print Now" button).

In step 414, the transaction charge is applied to the session account for the image. Within the context of the present invention, the image fulfillment session is initiated at step 400 and includes at least an image fulfillment process for each image of an order.

In step 416, the system proceeds to process the image in accordance with the user's instructions, for example, printing a 4×6 print without edits. Thereafter, the procedure will loop back to step 404 where the images are displayed on display 12 and then to step 406. At this point, the user can indicate that the image fulfillment session is complete, select "done", proceed to step 418 where the transaction is indicated as being "complete", and step 420 where the transaction ends.

If at step 406 the user desires to proceed with a second image without editing, the user can proceed as noted above for the second image. If the user desires to select a second image which is to be processed with editing, the user has the option of proceeding while the first image or images are being printed without edits. More specifically, the user can desire to print a second image with editing and thereby proceed to step 422 after step 406. At step 422, the user is given the option of editing now or adding the image to an edit queue. If the user proceeds to edit now, the procedure goes to step 424 where the user is instructed to edit the image at the kiosk, and thereafter, step 408 to the secure the transaction deposit for the printing of the second image. At that point, the procedure can continue with steps 410, 412, 414, 416 and the remaining steps as described above with respect to the printing of the first image in order to print the edited second image.

If the user has several images to edit, the user can proceed to step 426 after step 422 and add these images to an edit queue. As step 428, the user can choose to decide when the edit queue is completed. If not complete, the procedure loops to step 406 where the user can select further images for processing with editing. Once the editing queue is completed in step 428, the system proceeds to step 430 which will display the images in the edit queue on display 12. After that, the system proceeds to step 432 which permits the user to edit an image or images in the edit queue. When editing of an image is complete, the user is presented with the option to initiate fulfillment of the order for the edited image, such as "PRINT NOW", before proceeding to the next image in the edit queue. If processing is initiated, the system proceeds to step 434 which requests the user to secure a transaction deposit for the printing of the edited images. When the deposit is verified at step 436, the system confirms processing (step 438), applies the transaction charge to the transaction session account (step 440) and processes the image or images with edits (step 442). At step 444, it is determined if the edit queue is empty and if not, the system will loop back to step 430 to provide the user with the ability to continue editing the images in the queue which are on the display. If the edit queue is determined to be empty at step 444, the system proceeds back to step 404 which again is a display image step. This provides the user with ability to select a "done" button which completes the transaction (step 418) and ends the session (step 420). Thus, as described above, several image fulfillment processes have been described within an image fulfillment session. For each image fulfillment process there is a transaction secure deposit step and a verifying step, and the transaction session account is automatically updated in a running fashion. The system as described above can be performed and controlled in accordance with a processor and software in the kiosk.

Figure 12B:
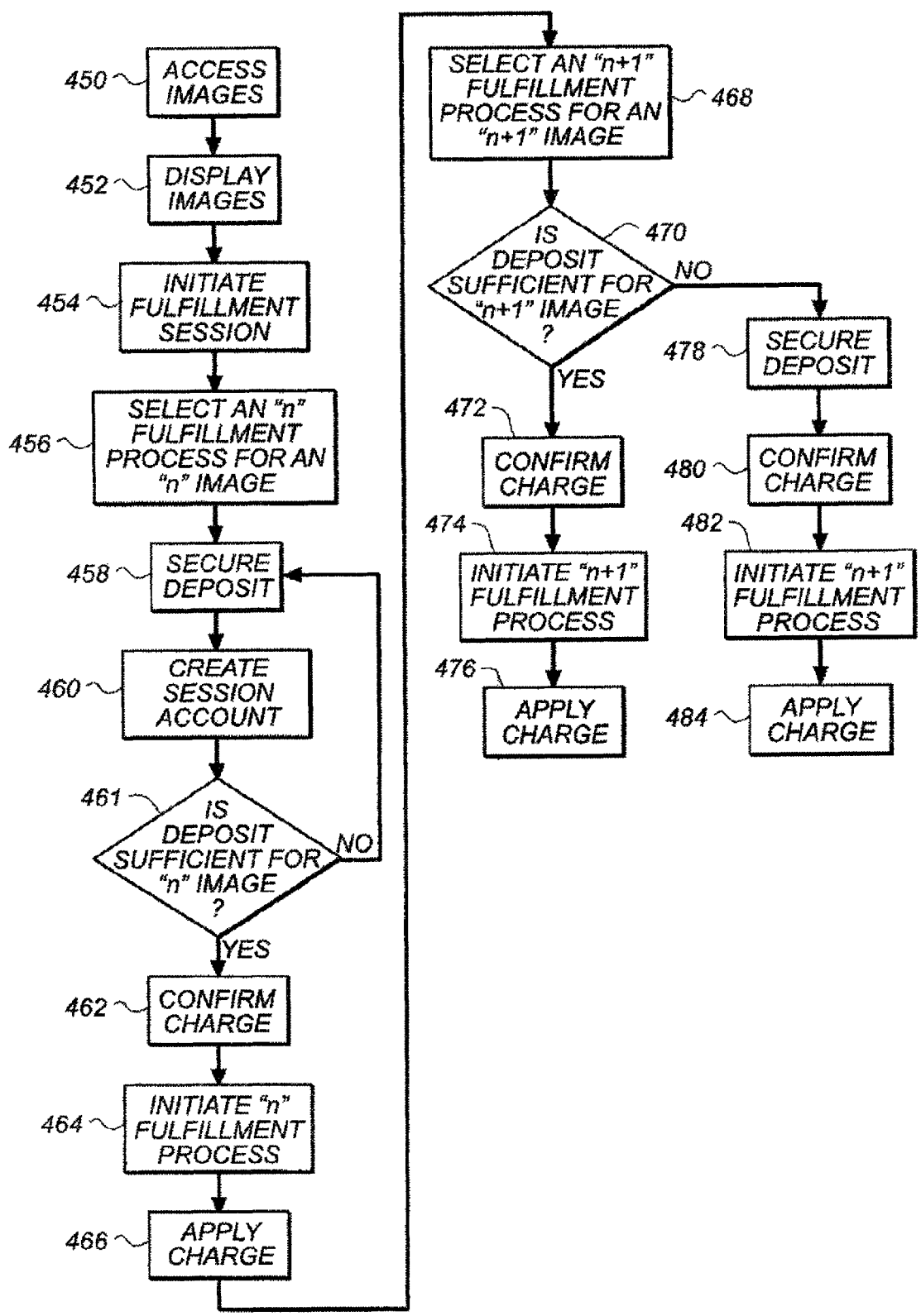

A variation of the method of FIG. 12A is shown in the flow chart of FIG. 12B. With regard to the flow chart of FIG. 12B, as shown, a user accesses a plurality of images (step 450) and displays at least one image on a display of the imaging device (step 452). The user can then initiate an image fulfillment session by selecting one of the images (n) of a plurality of images to be processed (step 454), and selecting a first image fulfillment process (step 456) for the first image. At that point, the system can secure a transaction deposit for payment for the first image fulfillment process for the first image (step 458), and create a transaction session account (step 460) for the first image fulfillment process. At this point, there is a verification to confirm that the deposit for payment is sufficient for image fulfillment of the first image (step 461). If yes, the system then is adapted to provide a confirmation of the transaction charge (step 462) in accordance with the first image fulfillment process that is to be applied to the transaction session account, and initiate the first image fulfillment process (step 464) for the first image. If no at step 641, the system will require that a user secure payment for the image fulfillment process (step 458).

The system of the present invention can then apply the transaction charge for completion of the first image fulfillment process to the transaction session account (step 466) and provide the user with the ability to select a second image fulfillment process for a second image (n+1) (step 468). The imaging device as described above, can include a CPU and software adapted to enable the process flow noted above. It is noted that the second image fulfillment process is part of the image fulfillment session initiated in step 454 for the first image. Once the second image fulfillment process is generated, there is verification that the deposit for payment with respect to the first image is sufficient for the second image fulfillment process for the second image (step 470). If the deposit for payment is sufficient for the second image fulfillment process, the method will confirm that a charge in accordance with at least the second image fulfillment process is to be applied to the transaction session account (step 472) and will initiate the second image fulfillment process for the second image (step 474). Thereafter, the charge for completion of the second image fulfillment process will be applied to the transaction session account (step 476).

If the deposit for payment is insufficient for the second image fulfillment process, the present invention will require that a user secure payment for the second image fulfillment process at that time (step 478). Thereafter, it will be confirmed that a transaction charge in accordance with the second image fulfillment process is to be applied to the transaction session account (step 480), and the second image fulfillment process is initiated (step 482). At that point, the charge for the second image fulfillment process will be added to the transaction session account (step 484). The user can then select further image fulfillment processing for further images in the user's order, and proceed as noted above until the transaction session is terminated. Each time an image fulfillment process is completed, the transaction cost is updated to reflect the completed image fulfillment process.

The invention as described with reference to FIG. 12B requires that a user display images prior to securing a deposit. However, in a variation of the method of FIG. 12B, the transaction session account can be created at the beginning of the process (for example, at step 450). This will enable the deposit to be secured for the first image fulfillment process prior to the customer accessing the plurality of digital images and selecting the first and subsequent image fulfillment processes. Therefore, with this arrangement, the individual will create a transaction session account when he approaches the imaging device or kiosk. At that point, the imaging device will require that the user secure the deposit for payment of a first image fulfillment process for a first image. After that, the individual can access the images, display the images on the display of the imaging device and select a first image to be processed. A transaction charge can then be confirmed in accordance with at least the first image fulfillment process and that charge can be applied to the transaction session account. Thereafter, the first image fulfillment process is initiated and the charge is applied to the session account. At that point, the individual has the option of selecting a second and subsequent image fulfillment processes for further images in his/her order as the first image is being processed.

Therefore, in one embodiment of the invention, the first image fulfillment process is initiated prior to applying a charge for the fulfillment to the transaction session account. In a further embodiment, the charge can be applied for the first image fulfillment process prior to the initiation of the first image fulfillment process for the first image.

A charge to the transaction session account enables the accumulation of the cost to the user for each partial fulfillment order initiates through the use of a "PRINT NOW" member or the like. When the user has completed the order fulfillment session, the total of the transaction session account is then processed by the payments, such as through a credit or debit card, or returning the appropriate amount of change if cash was tendered.

Accordingly, the system of the embodiments of the present invention can enable a user to immediately print images without edits, and while these images are being printed, the user has the ability to access further images to be edited. In the method, the user as noted above would access the images and display the images on the display of an imaging device. The user can then select at least one image for printing without modification by printing as is. This would generate a transaction cost for the imaging service or fulfillment process of the one image without image editing as described with reference to FIG. 11 and FIG. 12A. At that point, the system can secure the deposit for payment for the imaging service or fulfillment process of the image without editing and confirm that a charge in accordance with the imaging service or fulfillment process of the image without editing is to be applied to the transaction cost. Thereafter, the imaging service or fulfillment process can be performed on the image without editing. The imaging service or fulfillment process can be either a printing, transmittal or storage of the image. During the start of the imaging service or fulfillment process for the first image, the method can enable a user to select a second image for fulfillment, wherein the second image requires editing. At that point, the system can check to see that the deposit is sufficient to cover the printing of the second image with edits and add the cost for the imaging service or fulfillment process for the second image. Thereafter, the system is enabled to let the user edit the second image and proceed to print the second image. Further, although the present invention has been described with printing at a kiosk, the present invention is not limited thereto. Printing can occur at a later time at a separate printer which is not in the vicinity of the kiosk, at a minilab, etc. As a still further option, the display can include a time menu which can provide the user with the time remaining to complete printing. Thus, the parallel processing system as described above permits a customer to begin printing as soon as they are sure that they want a given print. This helps shorten the time of interaction by the amount of time used for editing and processing.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of operating an image processing device, the method comprising the steps of
    activating the image processing device, including the image processing device accessing at least one digital image file, each of the at least one digital image file including a digital image;
    processing a plurality of process requests received by the image processing device, comprising:
        a) identifying at least one digital image,
        b) selecting at least one editing step to be performed by the image processing device upon the at least one digital image,
        c) identifying a transaction account, the transaction account for transmitting a confirmation to the image processing device, the confirmation confirming availability of a charge amount sufficient to pay for each of the plurality of process requests in response to a charge amount confirmation request from the image processing device for said each of the plurality of process requests, and
        d) the image processing device transmitting the charge amount confirmation request to the transaction account and receiving the confirmation from the transaction account for a current one of the plurality of process requests; and
        editing said identified at least one digital image according to the selected at least one editing step at the same time that the image processing device is performing the step of processing upon a previously received one of the plurality of process requests.

2. A method according to claim 1 further comprising the step of the image processing device displaying a charge amount for the current one of the plurality of process requests.

3. A method according to claim 1 further comprising the step of the image processing device displaying a total of charge amounts for the plurality of process requests.

4. A method according to claim 1, wherein said current one of the plurality of process requests comprises printing the identified at least one digital image and a remainder of said plurality of process requests comprises printing at least one other identified digital image.

5. A method according to claim 1, wherein said current one of the plurality of process requests comprises storing the identified at least one digital image on an electronic storage medium and a remainder of said process requests comprises storing at least one other identified digital image on the electronic storage medium.

6. A method according to claim 1, wherein said current one of the plurality of process requests comprises electronically transmitting the identified at least one digital image through an on-line internet connection and a remainder of said process requests comprises electronically transmitting at least one other identified digital image through the on-line internet connection.

7. A method according to claim 1, wherein said current one of the plurality of process requests comprises printing the identified at least one digital image on a first printer and a remainder of said process requests comprises printing at least one other identified digital image on a second printer.

8. A method according to claim 1, wherein the step of processing said current one of the plurality of process requests comprises a step selected from the group consisting of: printing the identified at least one digital image, storing the identified at least one digital image, and transmitting the identified at least one digital image.

9. A method according to claim 1, wherein a step of processing said current one of the plurality of process requests and a step of processing said previously received one of the plurality of process requests each comprises a step selected from the group consisting of: printing at least one digital image, storing at least one digital image, and transmitting at least one digital image.

10. A method of providing image processing services, the method comprising the steps of
    receiving at an image processing station a plurality of image processing requests from a user, each of the image processing requests including at least one requested process and at least one digital image for undergoing the at least one requested process;
    receiving at the image processing station an identification of a transaction account, including the image processing station sending a charge amount confirmation request to the transaction account and receiving a confirmation from the transaction account of an availability of a charge amount sufficient to pay for a current one of the plurality of image processing requests; and
    permitting the user to edit the at least one digital image including displaying the at least one digital image on a display of the image processing station at the same time that the image processing station is performing another one of said at least one requested process upon another one of said at least one digital image.

11. A method according to claim 10 further comprising the step of displaying the charge amount on the display of the image processing station.

12. A method according to claim 10 further comprising the step of displaying a total charge amount for the plurality of image processing requests from the user.

13. A method according to claim 10, wherein said at least one requested process comprises printing said at least one digital image.

14. A method according to claim 10, wherein said at least one requested process comprises storing said at least one digital image on an electronic storage medium.

15. A method according to claim 10, wherein said at least one requested process comprises electronically transmitting said at least one digital image through an on-line internet connection.

16. A method according to claim 10, wherein said at least one requested process comprises printing said at least one digital image on a first printer and another one of said at least one requested process comprises printing said at least one digital image on a second printer.

17. A method according to claim 10, wherein said at least one requested process comprises a step selected from the group consisting of: printing said at least one digital image on a printer, storing said at least one digital image in an electronic storage location, and transmitting said at least one digital image through an on-line internet connection.

18. A method according to claim 10, wherein said at least one requested process is selected from the group consisting of printing said at least one digital image, storing said at least one digital image, and transmitting said at least one digital image, and wherein a second one of said at least one requested process is performed on a second one of said at least one digital image and is selected from the group consisting of printing said second one of said at least one digital image, storing said second one of said at least one digital image, and transmitting said second one of said at least one digital image.

* * * * *

UNITED STATES PATENT AND TRADEMARK OFFICE
CERTIFICATE OF CORRECTION

PATENT NO. : 7,813,962 B2  Page 1 of 1
APPLICATION NO. : 11/156321
DATED : October 12, 2010
INVENTOR(S) : Charles Stewart Christ, Jr. et al.

It is certified that error appears in the above-identified patent and that said Letters Patent is hereby corrected as shown below:

| Issued Patent | | Description of Error |
|---|---|---|
| Column | Line | |
| 15 | 46 (Approx.) | In Claim 1, delete "of" and insert -- of: --, therefor. |
| 16 | 52 | In Claim 10, delete "of" and insert -- of: --, therefor. |
| 18 | 11 | In Claim 18, delete "of" and insert -- of: --, therefor. |
| 18 | 16 | In Claim 18, delete "of" and insert -- of: --, therefor. |

Signed and Sealed this
Twenty-sixth Day of April, 2011

David J. Kappos
*Director of the United States Patent and Trademark Office*